United States Patent
Konabe

(10) Patent No.: US 11,093,768 B2
(45) Date of Patent: Aug. 17, 2021

(54) OCCUPANT MONITORING DEVICE AND OCCUPANT MONITORING METHOD

(71) Applicant: Mitsubishi Electric Corporation, Tokyo (JP)

(72) Inventor: Ryosuke Konabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/041,831

(22) PCT Filed: May 10, 2018

(86) PCT No.: PCT/JP2018/018151
§ 371 (c)(1),
(2) Date: Sep. 25, 2020

(87) PCT Pub. No.: WO2019/215879
PCT Pub. Date: Nov. 14, 2019

(65) Prior Publication Data
US 2021/0027079 A1  Jan. 28, 2021

(51) Int. Cl.
*G06K 9/00* (2006.01)
*B60W 40/08* (2012.01)
(Continued)

(52) U.S. Cl.
CPC ......... *G06K 9/00845* (2013.01); *B60W 40/08* (2013.01); *G06K 9/00604* (2013.01); *G06K 9/4661* (2013.01); *H04N 5/2353* (2013.01); *B60W 2040/0827* (2013.01); *B60W 2540/229* (2020.02)

(58) Field of Classification Search
None
See application file for complete search history.

(56) References Cited

U.S. PATENT DOCUMENTS

2015/0237246 A1* 8/2015 Omi .................. A61B 5/1128
348/362
2017/0118405 A1* 4/2017 Song .................. H04N 5/23219

FOREIGN PATENT DOCUMENTS

JP  2011-43961 A  3/2011

* cited by examiner

*Primary Examiner* — Thomas S McCormack
(74) *Attorney, Agent, or Firm* — Birch, Stewart, Kolasch & Birch, LLP.

(57) ABSTRACT

An occupant monitoring device includes processing circuitry to detect an eye of an occupant on a vehicle and to determine an eye opening degree of the eye using an image captured by an image capturing device having an automatic exposure adjusting function for adjusting an exposure time; to determine that the eye is closed when the eye opening degree of the eye is less than a predetermined eye opening degree threshold value; to deactivate the automatic exposure adjusting function when the automatic exposure adjusting function is active and the eye is determined to be closed; to detect brightness in a vicinity of the eye using an image which is captured by the image capturing device after the automatic exposure adjusting function is deactivated; and when the eye is determined to be closed, to determine that the occupant is in a drowsy state when the brightness in the vicinity of the eye is less than a predetermined brightness threshold value, and to determine that the occupant is in an awake state when the brightness is equal to or greater than the predetermined brightness threshold value.

6 Claims, 7 Drawing Sheets

(51) Int. Cl.
*G06K 9/46* (2006.01)
*H04N 5/235* (2006.01)

OCCUPANT MONITORING DEVICE AND OCCUPANT MONITORING METHOD

TECHNICAL FIELD

The present disclosure relates to an occupant monitoring device for and an occupant monitoring method of monitoring a state of an occupant on a vehicle.

BACKGROUND ART

Conventionally, there is a driver monitoring device that determines whether or not the driver of a vehicle is dozing off.

The above-mentioned driver monitoring device determines whether or not a driver's eyes are closed on the basis of a face image captured by a driver monitoring camera. The above-mentioned driver monitoring device then determines that the driver is dozing off when determining that the driver's eyes are closed.

In some cases, when a driver is dazzled by a light emitting body existing in front of the vehicle and then narrows his or her eyes, the above-mentioned driver monitoring device erroneously determines that the driver is dozing off. To solve this problem, a driver monitoring device according to Patent Literature 1 detects the light intensity of a light wave emitted toward the driver by using either a monitoring camera disposed outside the vehicle or an illuminometer, and corrects a threshold for determining whether or not the driver's eyes are closed in accordance with the light intensity.

CITATION LIST

Patent Literature

Patent Literature 1: JP 2011-43961 A

SUMMARY OF INVENTION

Technical Problem

In the driver monitoring device according to Patent Literature 1, there is a problem that the driver monitoring device needs to detect the light intensity by using either the monitoring camera disposed outside the vehicle or the illuminometer, and cannot perform drowsiness determination taking glare into consideration by using only a driver monitoring camera.

The present disclosure is made in order to solve the above-mentioned problem, and it is therefore an object of the present disclosure to provide a technique of performing drowsiness determination taking glare into consideration using only images captured by an image capturing device.

Solution to Problem

An occupant monitoring device according to the present disclosure includes a processing circuitry to detect an eye of an occupant on a vehicle and to determine an eye opening degree of the eye using an image captured by an image capturing device having an automatic exposure adjusting function for adjusting an exposure time; to determine that the eye is closed when the eye opening degree of the eye is less than a predetermined eye opening degree threshold value; to deactivate the automatic exposure adjusting function when the automatic exposure adjusting function is active and the eye is determined to be closed; to detect brightness in a vicinity of the eye using an image which is captured by the image capturing device after the automatic exposure adjusting function is deactivated; and when the eye is determined to be closed, to determine that the occupant is in a drowsy state when the brightness in the vicinity of the eye is less than a predetermined brightness threshold value, and to determine that the occupant is in an awake state when the brightness is equal to or greater than the predetermined brightness threshold value.

Advantageous Effects of Invention

According to the present disclosure, when it is determined, using a captured image, that an occupant's eye is closed, the automatic exposure adjusting function of the image capturing device is deactivated, and whether the occupant is in either the drowsy state or the awake state is determined on the basis of the brightness in the vicinity of the eye in an image which is captured while the automatic exposure adjusting function is inactive. Thus, drowsiness determination taking glare into consideration can be performed using only images captured by the image capturing device.

DESCRIPTION OF EMBODIMENTS

Hereinafter, in order to explain the present disclosure in greater detail, embodiments of the present disclosure will be described with reference to the accompanying drawings.

Embodiment 1

Figure 1:
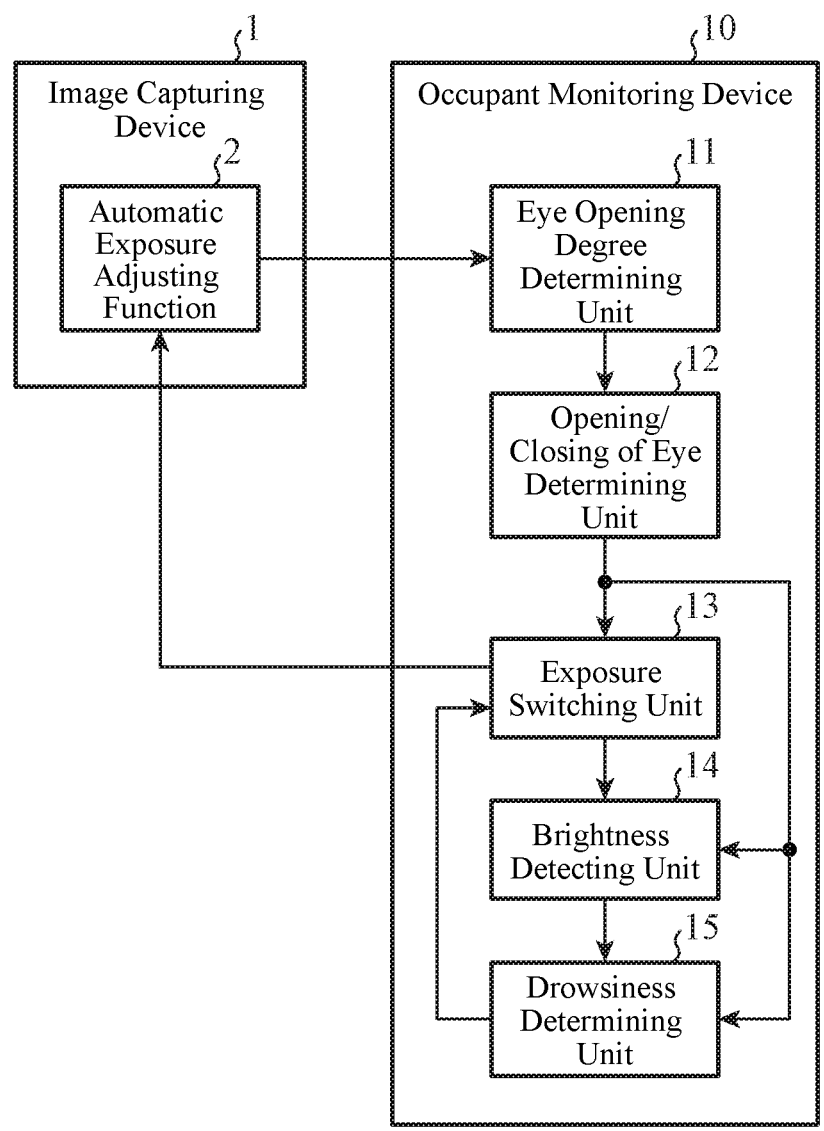
FIG. 1 is a block diagram showing an example of the configuration of an occupant monitoring device according to Embodiment 1.

FIG. 1 is a block diagram showing an example of the configuration of an occupant monitoring device 10 according to Embodiment 1. An image capturing device 1 and the occupant monitoring device 10 are mounted in a vehicle, and the image capturing device 1 and the occupant monitoring device 10 are electrically connected to each other.

The image capturing device 1 is a visible light camera, an infrared camera, or the like that captures an image of the inside of the vehicle. In the case in which the image capturing device 1 is an infrared camera, it is preferable that this infrared camera has an infrared light source (e.g., an infrared light emitting diode) that emits infrared light to the inside of the vehicle.

Further, the image capturing device 1 has an automatic exposure adjusting function 2. Switching between activation and deactivation of the automatic exposure adjusting function 2 is performed by an exposure switching unit 13 of the occupant monitoring device 10. When the automatic exposure adjusting function 2 is activated, the automatic exposure adjusting function 2 adjusts the exposure time of the image sensor in such a way that the average brightness of a captured image becomes predetermined brightness. When the automatic exposure adjusting function 2 is deactivated, the exposure time is fixed to a predetermined time.

The occupant monitoring device 10 includes an eye opening degree determining unit 11, an opening/closing of eye determining unit 12, the exposure switching unit 13, a brightness detecting unit 14, and a drowsiness determining unit 15.

The eye opening degree determining unit 11 acquires an image which is captured while the automatic exposure adjusting function 2 is active and an image which is captured while the automatic exposure adjusting function 2 is inactive. The eye opening degree determining unit 11 performs an edge detection process or the like by using each of the acquired images, to detect the position of an occupant's eye, especially, the positions of eyelids. The eye opening degree determining unit 11 then determines an eye opening degree on the basis of the detected position of the occupant's eye, especially, the positions of eyelids. A larger eye opening degree shows that the eye is more open, while a smaller eye opening degree shows that the eye is more closed. The eye opening degree determining unit 11 outputs pieces of information about each of the images, the position of the eye, and the eye opening degree to the opening/closing of eye determining unit 12.

The opening/closing of eye determining unit 12 compares the eye opening degree of the occupant's eye which is determined by the eye opening degree determining unit 11 while the automatic exposure adjusting function 2 is active and while the automatic exposure adjusting function 2 is inactive, and an eye opening degree threshold value. When the eye opening degree is less than the eye opening degree threshold value, the opening/closing of eye determining unit 12 determines that the eye is closed, whereas when the eye opening degree is equal to or greater than the eye opening degree threshold value, the opening/closing of eye determining unit 12 determines that the eye is open. The eye opening degree threshold value may be a value that makes it possible to determine that the eye is closed only in a state in which the eyelids are completely closed, or a value that makes it possible to determine that the eye is closed also in a state in which the eyelids are slightly open, in addition to the state in which the eyelids are completely closed. Further, the eye opening degree threshold value may be a value which is the same or differs between while the automatic exposure adjusting function 2 is active and while the automatic exposure adjusting function 2 is inactive. The opening/closing of eye determining unit 12 outputs pieces of information about each of the images, the position of the eye, and a result of the determination of whether the eye is open or closed to the exposure switching unit 13, the brightness detecting unit 14, and the drowsiness determining unit 15.

The exposure switching unit 13 switches between activation and deactivation of the automatic exposure adjusting function 2 of the image capturing device 1. The exposure switching unit 13 activates the automatic exposure adjusting function 2 when the below-mentioned drowsiness determining unit 15 determines that the occupant is in an awake state. On the other hand, in a case where the automatic exposure adjusting function 2 is active, the exposure switching unit 13 deactivates the automatic exposure adjusting function 2 when the opening/closing of eye determining unit 12 determines that the occupant's eye is closed. The deactivation of the automatic exposure adjusting function 2 makes it possible to determine how many light waves reach the occupant's face on the basis of an image captured by the image capturing device 1, thereby making it possible to determine whether the occupant is dazzled by the sunlight or the like. The exposure switching unit 13 outputs information about the switching between activation and deactivation of the automatic exposure adjusting function 2 to the brightness detecting unit 14.

When the automatic exposure adjusting function 2 is deactivated by the exposure switching unit 13, the brightness detecting unit 14 detects the brightness in the vicinity of the occupant's eye using an image which is captured by the image capturing device 1 in the state in which the automatic exposure adjusting function 2 is inactive. For example, the brightness detecting unit 14 detects the average brightness of the pixels included in a predetermined region with respect to the position of the eye. The brightness detecting unit 14 outputs information about the detected brightness to the drowsiness determining unit 15.

When the opening/closing of eye determining unit 12 determines that the occupant's eye is closed, the drowsiness determining unit 15 compares the brightness in the vicinity of the eye which is detected by the brightness detecting unit 14 and a predetermined brightness threshold value. When the eye is closed and the brightness in the vicinity of the eye is less than the brightness threshold value, the drowsiness determining unit 15 determines that the occupant is in a drowsy state. On the other hand, when the eye is closed and the brightness in the vicinity of the eye is equal to or greater than the brightness threshold value, the drowsiness determining unit 15 determines that the occupant is in the awake state because there is a high possibility that the occupant is dazzled by the sunlight or the like and his or her eye is closed. The drowsiness determining unit 15 outputs a result of the drowsiness determination to the exposure switching unit 13.

Hereinafter, the operation of the occupant monitoring device 10 will be explained using a case in which the occupant on the vehicle is the driver as an example.

Figure 2:
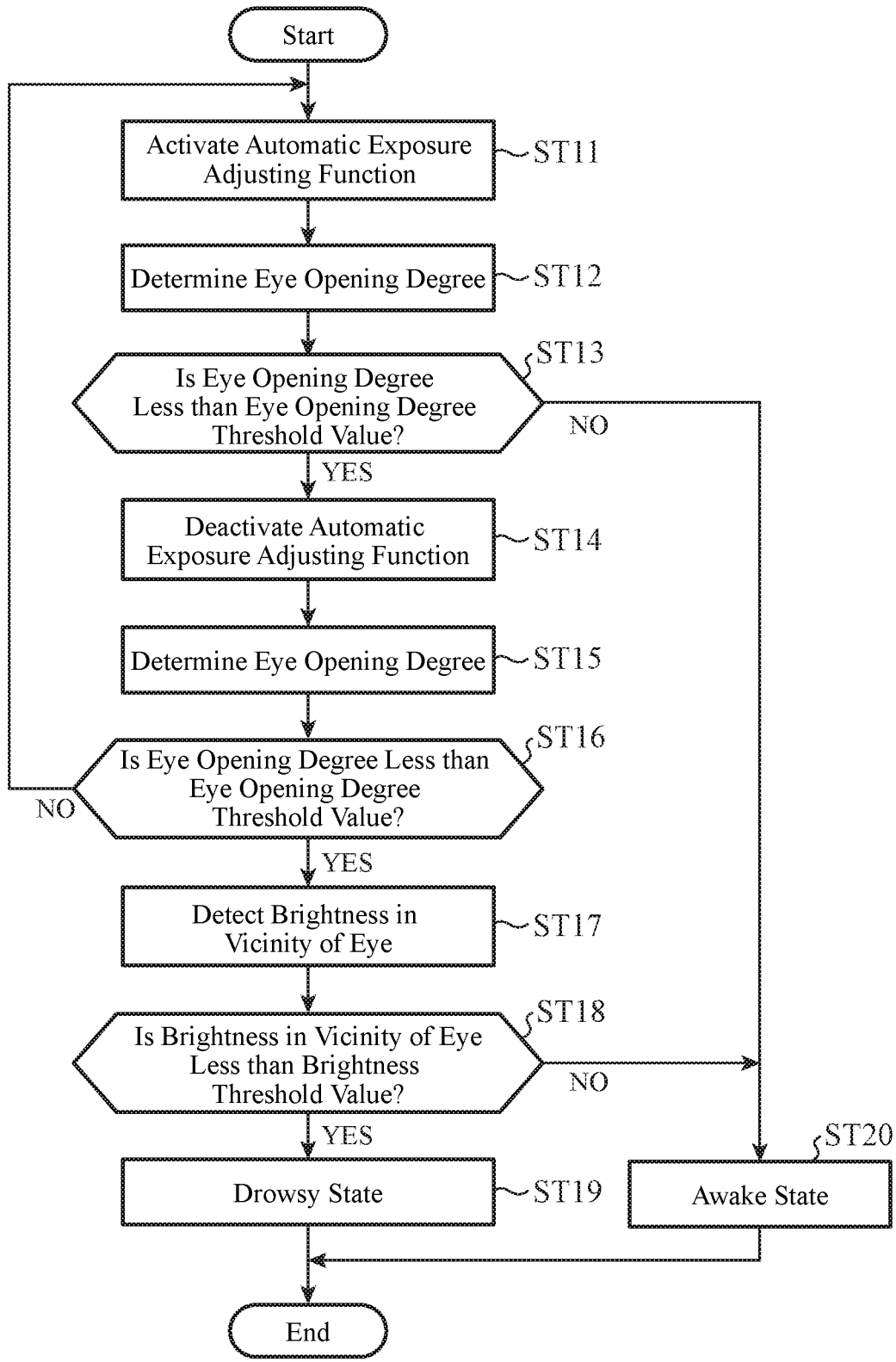
FIG. 2 is a flowchart showing an example of operations of the occupant monitoring device according to Embodiment 1.

FIG. 2 is a flowchart showing an example of operations of the occupant monitoring device 10 according to Embodiment 1. The occupant monitoring device 10 repeats the operations shown in the flowchart of FIG. 2 during a time period in which the engine of the vehicle is turned on, for example.

In step ST11, the exposure switching unit 13 activates the automatic exposure adjusting function 2 of the image capturing device 1. As a result, the image capturing device 1 adjusts the exposure time in accordance with the brightness of the driver's face and captures an image, and outputs the captured image to the occupant monitoring device 10.

In step ST12, using the image which is captured while the automatic exposure adjusting function 2 is active, the eye opening degree determining unit 11 detects the position of the driver's eye in this image. The eye opening degree determining unit 11 then determines the eye opening degree of the driver's eye on the basis of a result of the detection.

In step ST13, when the eye opening degree of the eye of the driver is less than the eye opening degree threshold value, i.e., when the eye is closed ("YES" in step ST13) while the automatic exposure adjusting function 2 is active, the operation of the opening/closing of eye determining unit 12 proceeds to step ST14. On the other hand, when the eye opening degree of the eye of the driver is equal to or greater than the eye opening degree threshold value, i.e., when the eye is open ("NO" in step ST13) while the automatic exposure adjusting function 2 is active, the opening/closing of eye determining unit 12 proceeds to step ST20.

In step ST14, because the driver's eye is closed while the automatic exposure adjusting function 2 is active, the exposure switching unit 13 deactivates the automatic exposure adjusting function 2. As a result, the image capturing device 1 captures an image with a fixed exposure time regardless of the brightness of the driver's face, and outputs the captured image to the occupant monitoring device 10.

In step ST15, using the image which is captured while the automatic exposure adjusting function 2 is inactive, the eye opening degree determining unit 11 detects the position of the driver's eye in this image. The eye opening degree determining unit 11 then determines the eye opening degree of the driver's eye on the basis of a result of the detection.

In step ST16, when the eye opening degree of the driver's eye is less than the eye opening degree threshold value, i.e., when the eye is closed ("YES" in step ST16) while the automatic exposure adjusting function 2 is inactive, the process of the opening/closing of eye determining unit 12 proceeds to step ST17. On the other hand, when the eye opening degree of the driver's eye is equal to or greater than the eye opening degree threshold value, i.e., when the eye is open ("NO" in step ST16) while the automatic exposure adjusting function 2 is inactive, the process of the opening/closing of eye determining unit 12 returns to step ST11.

In step ST17, the brightness detecting unit 14 detects the brightness in the vicinity of the driver's eye using an image which is captured while the automatic exposure adjusting function 2 is inactive.

In step ST18, when the brightness in the vicinity of the driver's eye in the image which is captured while the automatic exposure adjusting function 2 is inactive is less than the brightness threshold value ("YES" in step ST18), the process of the drowsiness determining unit 15 proceeds to step ST19, whereas when the brightness is equal to or greater than the brightness threshold value ("NO" in step ST18), the process of the drowsiness determining unit 15 proceeds to step ST20.

In step ST19, the drowsiness determining unit 15 determines that the driver is in the drowsy state. On the other hand, in step ST20, the drowsiness determining unit 15 determines that the driver is in the awake state.

As described above, the occupant monitoring device 10 according to Embodiment 1 includes the eye opening degree determining unit 11, the opening/closing of eye determining unit 12, the exposure switching unit 13, the brightness detecting unit 14, and the drowsiness determining unit 15. The eye opening degree determining unit 11 detects an eye of an occupant on a vehicle and determines an eye opening degree of the eye using an image captured by the image capturing device 1 having the automatic exposure adjusting function 2. The opening/closing of eye determining unit 12 determines that the eye is closed when the eye opening degree of the eye which is determined by the eye opening degree determining unit 11 is less than an eye opening degree threshold value. The exposure switching unit 13 deactivates the automatic exposure adjusting function 2 when the automatic exposure adjusting function 2 is active and the opening/closing of eye determining unit 12 determines that the eye is closed. The brightness detecting unit 14 detects the brightness in the vicinity of the eye using an image which is captured by the image capturing device 1 after the automatic exposure adjusting function 2 is deactivated by the exposure switching unit 13. When the opening/closing of eye determining unit 12 determines that the eye is closed, the drowsiness determining unit 15 determines that the occupant is in the drowsy state when the brightness in the vicinity of the eye which is detected by the brightness detecting unit 14 is less than the brightness threshold value, and determines that the occupant is in the awake state when the brightness is equal to or greater than the brightness threshold value. As described above, conventionally, the light intensity of a light wave emitted toward the driver is detected by either a monitoring camera disposed outside the vehicle or an illuminometer, and therefore the information from either the monitoring camera disposed outside the vehicle or the illuminometer is required in addition to information from a driver monitoring camera. In contrast with this, because the occupant monitoring device 10 of Embodiment 1 can perform drowsiness determination taking glare into consideration using an image from the image capturing device 1 for capturing an image of the inside of the vehicle, the occupant monitoring device 10 does not need information from either a monitoring camera disposed outside the vehicle or an illuminometer. Further, it seems that it is difficult for a monitoring camera disposed outside the vehicle to detect how many light waves reach an occupant's eye with a high degree of accuracy. In contrast with this, because the occupant monitoring device 10 of Embodiment 1 uses an image from the image capturing device 1 for capturing an image of the inside of the vehicle, the occupant monitoring device 10 can detect the position of an occupant's eye and the light intensity of light waves reaching the eye with a high degree of accuracy, and can discriminate between the drowsy state and the awake state with a high degree of accuracy.

Embodiment 2

Because the configuration of an occupant monitoring device 10 according to Embodiment 2 is the same as the configuration shown in FIG. 1 of Embodiment 1 in the drawings, an explanation will be made using FIG. 1.

Figure 3:
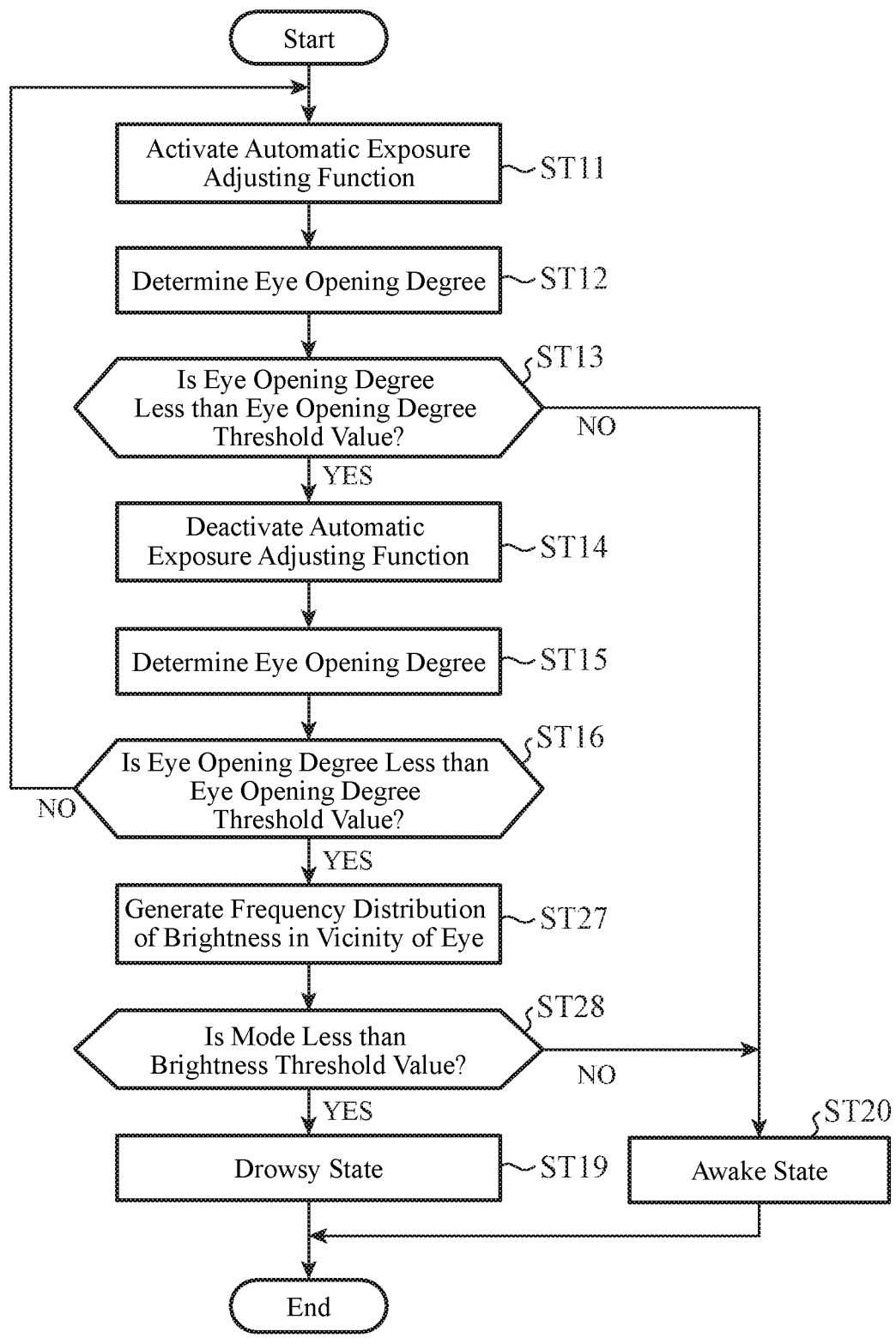
FIG. 3 is a flowchart showing an example of operations of an occupant monitoring device according to Embodiment 2.

FIG. 3 is a flowchart showing an example of operations of the occupant monitoring device 10 according to Embodiment 2. Operations in steps ST11 to ST16, ST19, and ST20 of FIG. 3 are the same as those in steps ST11 to ST16, ST19, and ST20 of FIG. 2.

In step ST27, a brightness detecting unit 14 detects the brightness in the vicinity of an eye in each of the images using multiple time-series images (e.g., images taken for several seconds) which are captured by an image capturing device 1 while an automatic exposure adjusting function 2 is inactive. The brightness detecting unit 14 then generates a frequency distribution of the brightness from time-series data of the detected brightness.

In step ST28, a drowsiness determining unit 15 compares the mode of the frequency distribution of the brightness generated by the brightness detecting unit 14 in step ST27 and a brightness threshold value. When the mode of the frequency distribution of the brightness is less than the brightness threshold value ("YES" in step ST28), the process of the drowsiness determining unit 15 proceeds to step ST19, whereas when the mode is equal to or greater than the brightness threshold value ("NO" in step ST28), the process of the drowsiness determining unit proceeds to step ST20.

As described above, the brightness detecting unit 14 of Embodiment 2 generates a frequency distribution of brightness from time-series data of the brightness in the vicinity of an eye. When the mode of the frequency distribution of the brightness generated by the brightness detecting unit 14 is less than the brightness threshold value, the drowsiness determining unit 15 determines that the occupant is in a drowsy state, whereas when the mode is equal to or greater than the brightness threshold value, the drowsiness determining unit 14 determines that the occupant is in an awake state. As a result, the drowsiness determining unit 15 can discriminate between the drowsy state and the awake state with a high degree of accuracy in consideration of time variations in the brightness in the vicinity of the eye.

Embodiment 3

Because the configuration of an occupant monitoring device 10 according to Embodiment 3 is the same as the configuration shown in FIG. 1 of Embodiment 1 in the drawings, an explanation will be made using FIG. 1.

Figure 4:
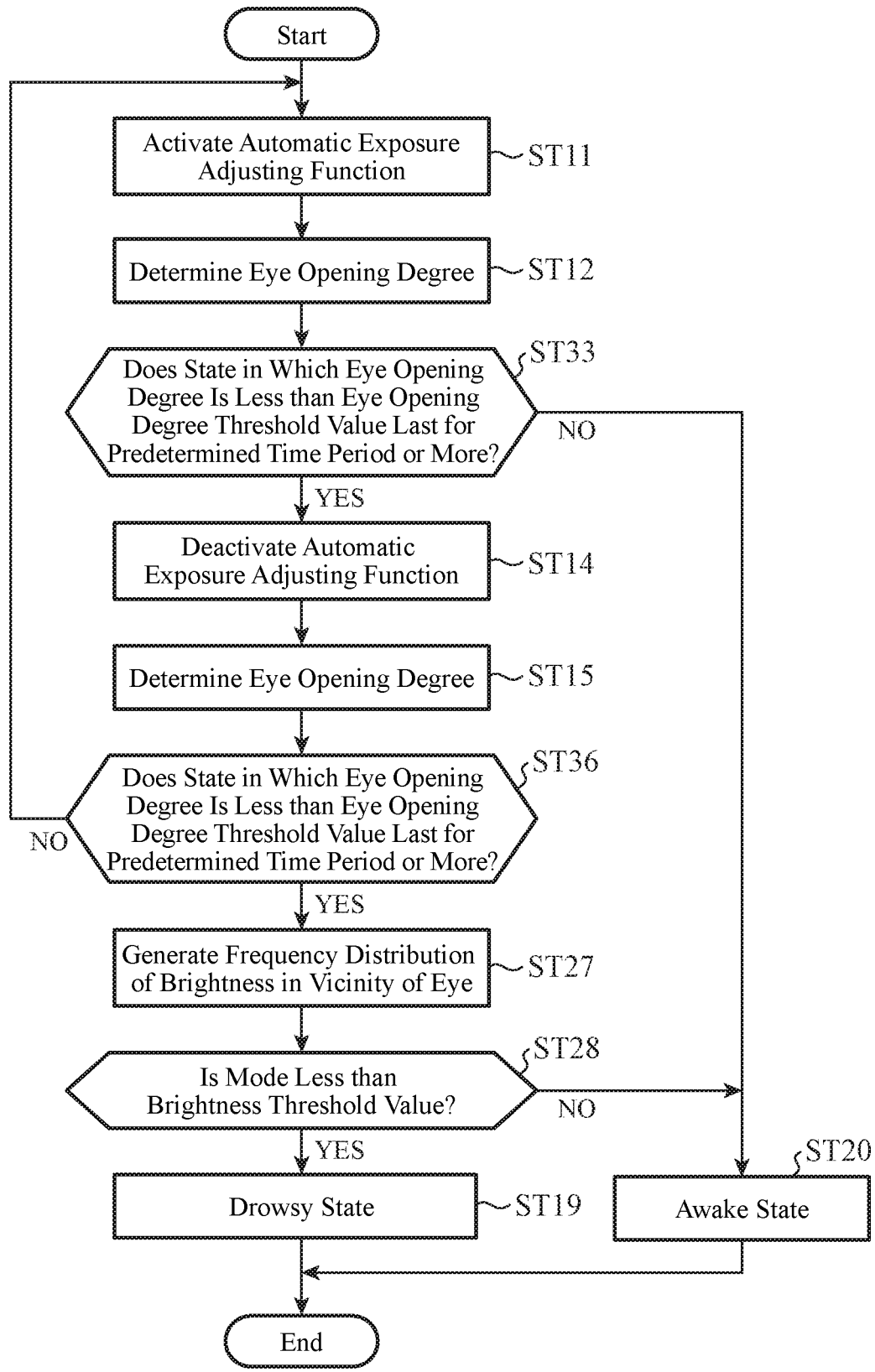
FIG. 4 is a flowchart showing an example of operations of an occupant monitoring device according to Embodiment 3.

FIG. 4 is a flowchart showing an example of operations of the occupant monitoring device 10 according to Embodiment 3. Operations in steps ST11, ST12, ST14, ST15, ST19, ST20, ST27, and ST28 of FIG. 4 are the same as those in steps ST11, ST12, ST14, ST15, ST19, ST20, ST27, and ST28 of FIG. 3.

In step ST33, an opening/closing of eye determining unit 12 compares an eye opening degree which is determined, in step ST12, by an eye opening degree determining unit 11 while an automatic exposure adjusting function 2 is active, and an eye opening degree threshold value. Then, when a state in which the eye opening degree is less than the eye opening degree threshold value lasts for a predetermined time period or more ("YES" in step ST33), the opening/closing of eye determining unit 12 determines that a closed-eye state has been maintained, and then proceeds to step ST14. On the other hand, when the state in which the eye opening degree is less than the eye opening degree threshold value does not last for the predetermined time period or more ("NO" in step ST33), the opening/closing of eye determining unit 12 determines that an open-eye state occurs, and then proceeds to step ST20. The predetermined time period is, for example, several seconds.

In step ST36, the opening/closing of eye determining unit 12 compares the eye opening degree which is determined, in step ST15, by the eye opening degree determining unit 11 while the automatic exposure adjusting function 2 is inactive, and an eye opening degree threshold value. Then, when the state in which the eye opening degree is less than the eye opening degree threshold value lasts for a predetermined time period or more ("YES" in step ST36), the opening/closing of eye determining unit 12 determines that the closed-eye state has been maintained, and then proceeds to step ST27. On the other hand, when the state in which the eye opening degree is less than the eye opening degree threshold value does not last for the predetermined time period or more ("NO" in step ST36), the opening/closing of eye determining unit 12 determines that the open-eye state occurs, and then returns to step ST11.

As described above, when the state in which the eye opening degree of the eye is less than the eye opening degree threshold value lasts for the predetermined time period, the opening/closing of eye determining unit 12 of Embodiment 3 determines that the eye is closed. As a result, an exposure switching unit 13 can switch between activation and deactivation of the automatic exposure adjusting function 2 in consideration of time variations in the eye opening degree.

In the example of FIG. 4, Embodiment 2 and Embodiment 3 are combined. Alternatively, Embodiment 1 and Embodiment 3 may be combined.

Embodiment 4

Because the configuration of an occupant monitoring device 10 according to Embodiment 4 is the same as the configuration shown in FIG. 1 of Embodiment 1 in the drawings, an explanation will be made using FIG. 1.

Figure 5:
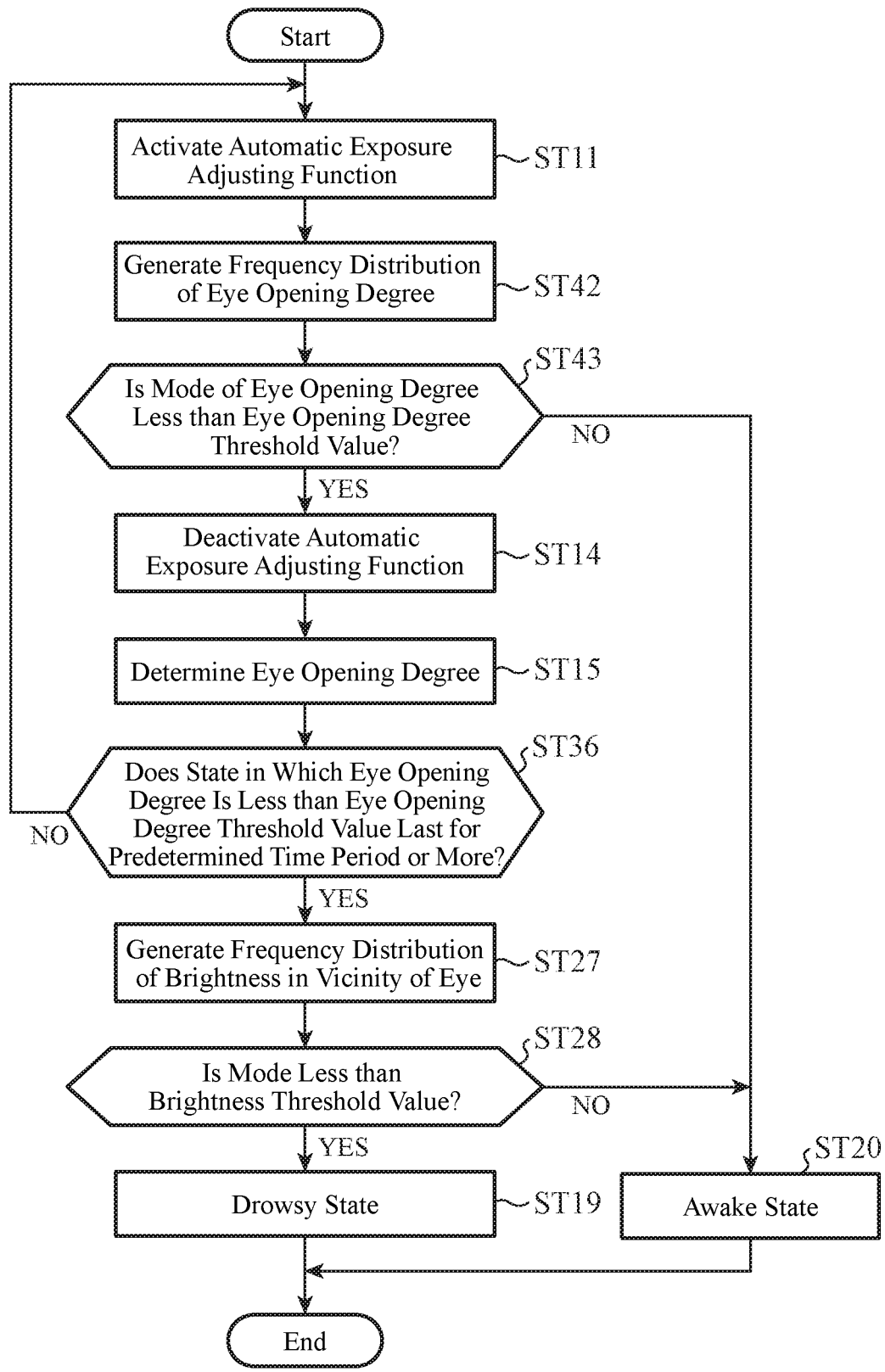
FIG. 5 is a flowchart showing an example of operations of an occupant monitoring device according to Embodiment 4.

FIG. 5 is a flowchart showing an example of operations of the occupant monitoring device 10 according to Embodiment 4. Operations in steps ST11, ST14, ST15, ST19, ST20, ST27, ST28, and ST36 of FIG. 5 are the same as those in steps ST11, ST14, ST15, ST19, ST20, ST27, ST28, and ST36 of FIG. 4.

In step ST42, using multiple time-series images (e.g., images taken for several seconds) which are captured by an image capturing device 1 while an automatic exposure adjusting function 2 is active, an eye opening degree determining unit 11 detects the position of the driver's eye in each of the images. The eye opening degree determining unit 11 then generates a frequency distribution of a detected eye opening degree from time-series data of the eye opening degree.

In step ST43, an opening/closing of eye determining unit 12 compares the mode of the frequency distribution of the eye opening degree, the frequency distribution being generated by the eye opening degree determining unit 11 in step ST42, and an eye opening degree threshold value. When the mode of the frequency distribution of the eye opening degree is less than the eye opening degree threshold value ("YES" in step ST43), the process of the opening/closing of eye determining unit 12 proceeds to step ST14, whereas when the mode is equal to or greater than the eye opening degree threshold value ("NO" in step ST43), the process of the opening/closing of eye determining unit proceeds to step ST20.

As described above, the eye opening degree determining unit 11 according to Embodiment 4 generates a frequency distribution of the eye opening degree of the eye from the time-series data of the eye opening degree. When the mode of the frequency distribution of the eye opening degree generated by the eye opening degree determining unit 11 is less than the eye opening degree threshold value, the opening/closing of eye determining unit 12 determines that the eye is closed. As a result, an exposure switching unit 13 can deactivate the automatic exposure adjusting function 2 in consideration of time variations in the eye opening degree.

Although in the example of FIG. 5 the occupant monitoring device 10 uses the frequency distribution of the eye opening degree for the determination of whether or not to deactivate the automatic exposure adjusting function 2 (step ST43) and uses the duration of a closed-eye state for the determination of whether or not to activate the automatic exposure adjusting function 2 (step ST36), no limitation is intended to this configuration. For example, the occupant monitoring device 10 may use the duration of the closed-eye state for the determination of whether or not to deactivate the automatic exposure adjusting function 2, and use the frequency distribution of the eye opening degree for the determination of whether or not to activate the automatic exposure adjusting function 2. Further, for example, the occupant monitoring device 10 may use the frequency distribution of the eye opening degree for both the determination of whether or not to deactivate the automatic exposure adjusting function 2 and the determination of whether or not to activate the automatic exposure adjusting function. Further, for example, the occupant monitoring device 10 may use the duration of the closed-eye state for both the determination of whether or not to deactivate the automatic exposure adjusting function 2 and the determination of whether or not to activate the automatic exposure adjusting function.

Further, although Embodiment 3 and Embodiment 4 are combined in the example of FIG. 5, at least one of Embodiment 1 and Embodiment 2, and Embodiment 4 may be combined.

Embodiment 5

Because the configuration of an occupant monitoring device 10 according to Embodiment 5 is the same as the configuration shown in FIG. 1 of Embodiment 1 in the drawings, an explanation will be made using FIG. 1.

Figure 6:
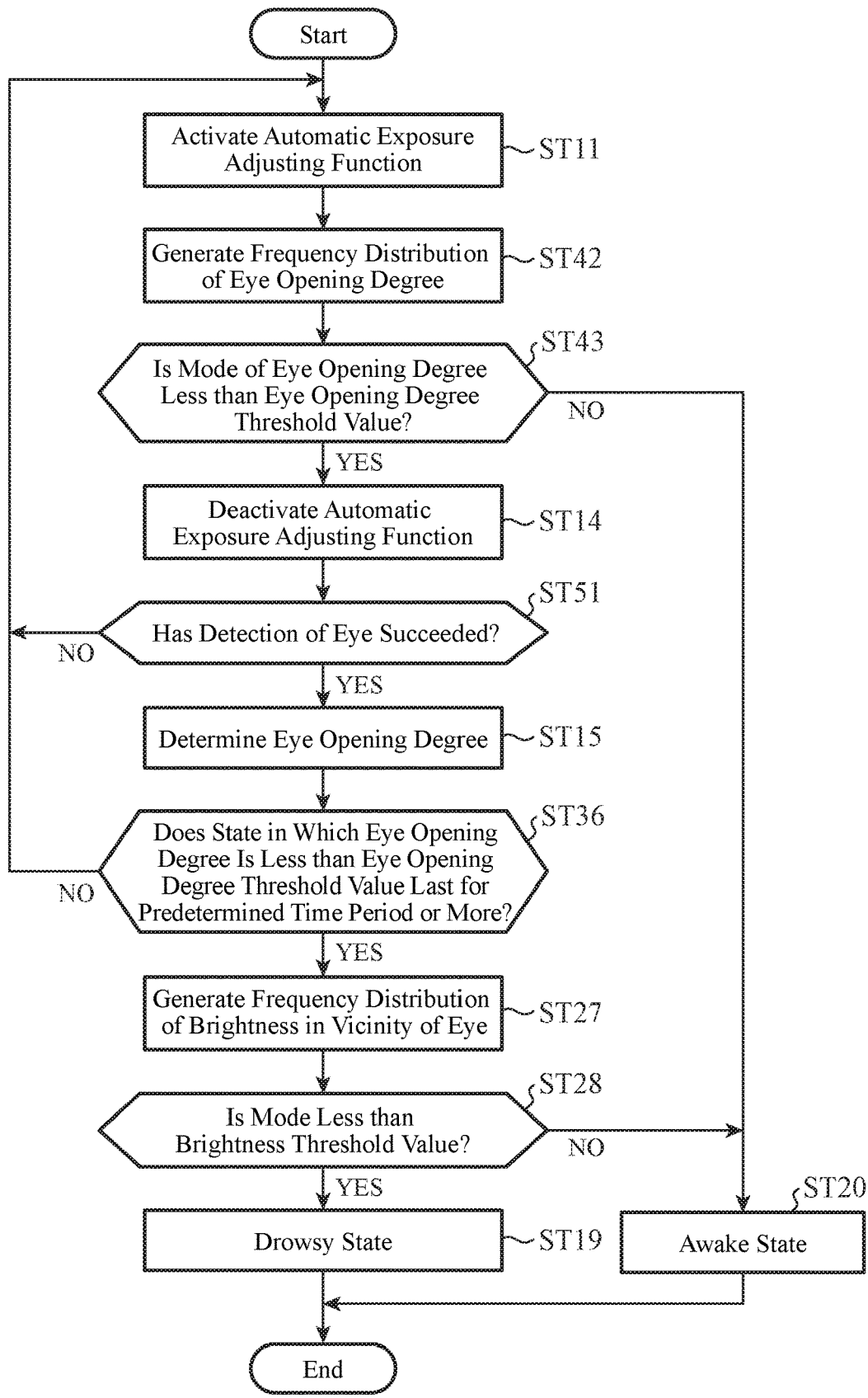
FIG. 6 is a flowchart showing an example of operations of an occupant monitoring device according to Embodiment 5.

FIG. 6 is a flowchart showing an example of operations of the occupant monitoring device 10 according to Embodiment 5. Operations in steps other than step ST51 of FIG. 6 are the same as those shown in the flowchart of FIG. 5.

In step ST51, using an image which is captured by an image capturing device 1 while an automatic exposure adjusting function 2 is inactive, an eye opening degree determining unit 11 detects the position of the driver's eye in this image. At this time, when having succeeded in detecting the position of the eye ("YES" in step ST51), the process of the eye opening degree determining unit 11 proceeds to step ST15, whereas when having failed in detecting the position of the eye ("NO" in step ST51), the process of the eye opening degree determining unit 11 returns to step ST11. More specifically, when the eye opening degree determining unit 11 has failed in detecting the eye, a drowsiness determining unit 15 does not determine whether the driver is in either a drowsy state or an awake state.

A case when the eye opening degree determining unit 11 has failed in detecting the eye is a case when the position of the eye cannot be detected because there occurs a state in which the brightness in the vicinity of the eye is high under the influence of the sunlight or the like, and blown out highlights appear, a case when the position of the eye cannot be detected because the light intensity in the vehicle or the quantity of light of an infrared light source is insufficient and the brightness in the vicinity of the eye is low, and blocked up shadows appear, a case when the position of the eye cannot be detected because the occupant's eye is hidden by a hand or the like, or the like.

As described above, when the eye opening degree determining unit 11 has failed in detecting an occupant's eye, the drowsiness determining unit 15 of Embodiment 5 does not determine whether the occupant is in either the drowsy state or the awake state. As a result, the drowsiness determining unit 15 can prevent erroneous determination.

Although Embodiment 4 and Embodiment 5 are combined in the example of FIG. 6, at least one of Embodiment 1, Embodiment 2, and Embodiment 3, and Embodiment 5 may be combined.

Figure 7A:
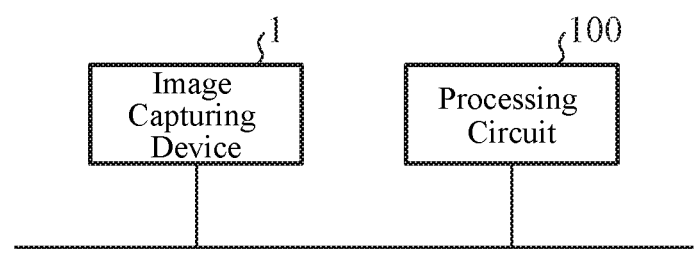
FIGS. 7A and 7B are diagrams showing examples of the hardware configuration of the occupant monitoring device according to each embodiment.
Figure 7B:
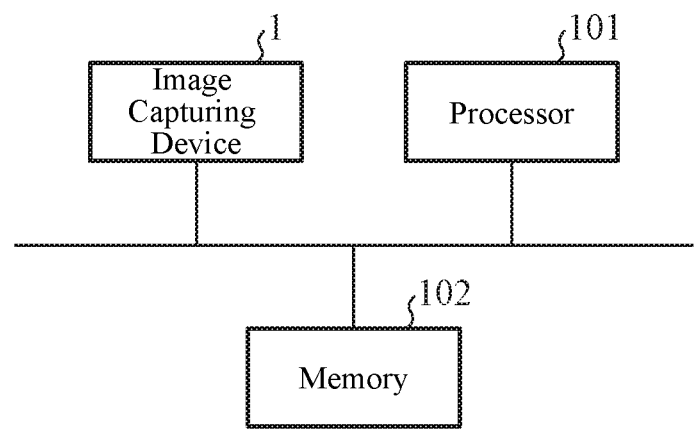

Finally, the hardware configuration of the occupant monitoring device 10 according to each of the embodiments will be explained. FIGS. 7A and 7B are diagrams showing examples of the hardware configuration of the occupant monitoring device 10 according to each of the embodiments. The functions of the eye opening degree determining unit 11, the opening/closing of eye determining unit 12, the exposure switching unit 13, the brightness detecting unit 14, and the drowsiness determining unit 15 in the occupant monitoring device 10 are implemented by a processing circuit. More specifically, the occupant monitoring device 10 includes a processing circuit for implementing of the above-mentioned functions. The processing circuit may be a processing circuit 100 as hardware for exclusive use or a processor 101 that executes a program stored in a memory 102.

In the case in which the processing circuit is hardware for exclusive use, as shown in FIG. 7A, the processing circuit 100 is, for example, a single circuit, a composite circuit, a programmable processor, a parallel programmable processor, an application specific integrated circuit (ASIC), a field programmable gate array (FPGA), or a combination of these circuits. The functions of the eye opening degree determining unit 11, the opening/closing of eye determining unit 12, the exposure switching unit 13, the brightness detecting unit 14, and the drowsiness determining unit 15 may be implemented by multiple processing circuits 100, or the functions may be implemented collectively by a single processing circuit 100.

In the case in which the processing circuit is the processor 101, as shown in FIG. 7B, the functions of the eye opening degree determining unit 11, the opening/closing of eye determining unit 12, the exposure switching unit 13, the brightness detecting unit 14, and the drowsiness determining unit 15 are implemented by software, firmware, or a combination of software and firmware. The software or the firmware is described as a program and the program is stored in the memory 102. The processor 101 implements the function of each of the units by reading and executing a program stored in the memory 102. More specifically, the occupant monitoring device 10 includes the memory 102 for storing a program in which the steps shown in each of the flowcharts of FIG. 2 and so on are performed as a result when the program is executed by the processor 101. Further, it can be said that this program causes a computer to perform procedures or methods which the eye opening degree determining unit 11, the opening/closing of eye determining unit 12, the exposure switching unit 13, the brightness detecting unit 14, and the drowsiness determining unit 15 use.

Here, the processor 101 is a central processing unit (CPU), a processing device, an arithmetic device, a microprocessor, or the like.

The memory 102 may be a non-volatile or volatile semiconductor memory such as a random access memory (RAM), a read only memory (ROM), an erasable programmable ROM (EPROM), or a flash memory, may be a magnetic disc such as a hard disc or a flexible disc, or may be an optical disc such as a compact disc (CD) or a digital versatile disc (DVD).

A part of the functions of the eye opening degree determining unit 11, the opening/closing of eye determining unit 12, the exposure switching unit 13, the brightness detecting unit 14, and the drowsiness determining unit 15 may be implemented by hardware for exclusive use, and a part of the functions may be implemented by software or firmware. As described above, the processing circuit in the occupant monitoring device 10 can implement of the above-mentioned functions by using hardware, software, firmware, or a combination of hardware, software, and firmware.

It is to be understood that any combination of two or more of the embodiments can be made, various changes can be made in any component according to any one of the embodiments, or any component according to any one of the embodiments can be omitted within the scope of the present disclosure.

INDUSTRIAL APPLICABILITY

Because the occupant monitoring device according to the present disclosure determines an occupant's drowsy state using an image from an image capturing device for capturing an image of the inside of a vehicle, the occupant monitoring device is suitable for use for driver monitoring devices that monitor the driver's state, and so on.

REFERENCE SIGNS LIST

1 image capturing device, 2 automatic exposure adjusting function, 10 occupant monitoring device, 11 eye opening degree determining unit, 12 opening/closing of eye determining unit, 13 exposure switching unit, 14 brightness detecting unit, 15 drowsiness determining unit, 100 processing circuit, 101 processor, and 102 memory.

The invention claimed is:

1. An occupant monitoring device comprising processing circuitry
    to detect an eye of an occupant on a vehicle and to determine an eye opening degree of the eye using an image captured by an image capturing device having an automatic exposure adjusting function for adjusting an exposure time;
    to determine that the eye is closed when the eye opening degree of the eye is less than a predetermined eye opening degree threshold value;
    to deactivate the automatic exposure adjusting function when the automatic exposure adjusting function is active and the eye is determined to be closed;
    to detect brightness in a vicinity of the eye using an image which is captured by the image capturing device after the automatic exposure adjusting function is deactivated; and
    when the eye is determined to be closed, to determine that the occupant is in a drowsy state when the brightness in the vicinity of the eye is less than a predetermined brightness threshold value, and to determine that the occupant is in an awake state when the brightness is equal to or greater than the predetermined brightness threshold value.

2. The occupant monitoring device according to claim 1, wherein the processing circuitry further performs
    to generate a frequency distribution of the brightness from time-series data of the brightness in the vicinity of the eye, and
    to determine that the occupant is in the drowsy state when a mode of the frequency distribution of the brightness is less than the brightness threshold value, and to determine that the occupant is in the awake state when the mode is equal to or greater than the brightness threshold value.

3. The occupant monitoring device according to claim 1, wherein when a state in which the eye opening degree of the eye is less than the eye opening degree threshold value lasts for a predetermined time period, the eye is determined to be closed.

4. The occupant monitoring device according to claim 1, wherein the processing circuitry further performs
    to generate a frequency distribution of the eye opening degree from time-series data of the eye opening degree of the eye, and
    when a mode of the frequency distribution of the eye opening degree is less than the eye opening degree threshold value, the eye is determined to be closed.

5. The occupant monitoring device according to claim 1, wherein when it is failed to detect the eye of the occupant, the processing circuitry does not determine whether the occupant is in either the drowsy state or the awake state.

6. An occupant monitoring method comprising:
    detecting an eye of an occupant on a vehicle and determining an eye opening degree of the eye using an image captured by an image capturing device having an automatic exposure adjusting function for adjusting an exposure time, the image being captured while the automatic exposure adjusting function is active;
    determining that the eye is closed when the eye opening degree of the eye while the automatic exposure adjusting function is active is less than a predetermined eye opening degree threshold value;
    deactivating the automatic exposure adjusting function when the eye is determined to be closed;
    detecting the eye of the occupant and determining the eye opening degree of the eye using an image which is captured by the image capturing device after the automatic exposure adjusting function is deactivated;
    determining that the eye is closed when the eye opening degree of the eye while the automatic exposure adjusting function is inactive is less than a predetermined eye opening degree threshold value;
    when the eye is determined to be closed while the automatic exposure adjusting function is inactive, detecting brightness in a vicinity of the eye using an image which is captured by the image capturing device while the automatic exposure adjusting function is inactive; and
    determining that the occupant is in a drowsy state when the brightness in the vicinity of the eye is less than a predetermined brightness threshold value, and determining that the occupant is in an awake state when the brightness is equal to or greater than the brightness threshold value.

* * * * *